United States Patent
Pierno et al.

(10) Patent No.: US 8,466,831 B2
(45) Date of Patent: Jun. 18, 2013

(54) SWITCHABLE DELAYS OPTICAL FIBRE TRANSPONDER WITH OPTICAL GENERATION OF DOPPLER SHIFT

(75) Inventors: Luigi Pierno, Rome (IT); Mauro Varasi, Rome (IT)

(73) Assignee: Selex Sistemi Integrati S.p.A., Rome (IT)

( * ) Notice: Subject to any disclaimer, the term of this patent is extended or adjusted under 35 U.S.C. 154(b) by 211 days.

(21) Appl. No.: 13/119,664

(22) PCT Filed: Sep. 18, 2008

(86) PCT No.: PCT/IT2008/000601
§ 371 (c)(1),
(2), (4) Date: May 26, 2011

(87) PCT Pub. No.: WO2010/032272
PCT Pub. Date: Mar. 25, 2010

(65) Prior Publication Data
US 2011/0221627 A1    Sep. 15, 2011

(51) Int. Cl.
*G01S 7/40* (2006.01)
*G02B 26/00* (2006.01)

(52) U.S. Cl.
USPC ........... 342/174; 342/165; 342/169; 342/172; 359/237

(58) Field of Classification Search
USPC ....... 342/165–175; 385/1–147; 398/182–201; 359/237–324
See application file for complete search history.

(56) References Cited

U.S. PATENT DOCUMENTS

| | | | | | |
|---|---|---|---|---|---|
| 4,918,373 | A | * | 4/1990 | Newberg | 324/613 |
| 5,177,488 | A | * | 1/1993 | Wang et al. | 342/167 |
| 5,262,786 | A | * | 11/1993 | Cross | 342/167 |
| 5,339,087 | A | * | 8/1994 | Minarik | 342/375 |
| 5,493,304 | A | * | 2/1996 | Lee et al. | 342/360 |
| 5,518,400 | A | * | 5/1996 | Otoide et al. | 434/4 |
| 5,835,212 | A | * | 11/1998 | Kissa et al. | 356/477 |
| 6,346,909 | B1 | * | 2/2002 | Johnson et al. | 342/169 |
| 6,492,939 | B1 | * | 12/2002 | Fredericks et al. | 342/172 |
| 7,145,504 | B1 | * | 12/2006 | Newberg et al. | 342/169 |
| 7,245,787 | B2 | * | 7/2007 | Kawanishi et al. | 385/1 |
| 7,245,788 | B2 | * | 7/2007 | Fujita et al. | 385/3 |
| 7,817,923 | B2 | * | 10/2010 | Akiyama et al. | 398/188 |
| 7,853,153 | B2 | * | 12/2010 | Kawanishi et al. | 398/183 |
| 7,957,652 | B2 | * | 6/2011 | Kawanishi et al. | 398/186 |
| 2003/0102938 | A1 | * | 6/2003 | Erlig et al. | 333/156 |
| 2005/0111853 | A1 | * | 5/2005 | Kawanishi et al. | 398/187 |
| 2005/0141814 | A1 | * | 6/2005 | Efimov | 385/39 |

(Continued)

*Primary Examiner* — Jack W Keith
*Assistant Examiner* — Peter Bythrow
(74) *Attorney, Agent, or Firm* — Arent Fox, LLP

(57) ABSTRACT

An optical modulator comprising an input suitable to receive an optical carrier, and two Mach-Zender modulators in parallel, which constitute two different optical paths, the whole circuit constituting a third Mach-Zender modulator, the optical modulator being characterized in that:
 the first Mach-Zender modulator is provided with an electrode suitable to carry two signals, each obtained by the sum of the two tones $f_R$ and $f_D$, of equal power but dephased of $\pi/2$, and with an electrode for realizing a Single Side Band modulation of the tones $f_R$ and $f_D$;
 the second Mach-Zender modulator is biased by means of a DC electrode;
 the third Mach-Zender modulator comprising an electrode suitable to realize the reversal of the optical carrier phase of the signals deriving from the first and the second Mach-Zender modulator, so as to suppress the optical carrier and thus obtaining only the tones $f_R$ and $f_D$ in the optical spectrum.

10 Claims, 6 Drawing Sheets

U.S. PATENT DOCUMENTS

| | | |
|---|---|---|
| 2005/0213862 A1* | 9/2005 | Kawanishi et al. ................ 385/1 |
| 2005/0220385 A1* | 10/2005 | Kawanishi et al. ................ 385/1 |
| 2006/0263098 A1* | 11/2006 | Akiyama et al. .............. 398/188 |
| 2009/0103924 A1* | 4/2009 | Kawanishi et al. ........... 398/115 |
| 2009/0279825 A1* | 11/2009 | Kawanishi et al. ................ 385/2 |
| 2009/0309783 A1* | 12/2009 | Shih et al. ...................... 342/172 |
| 2010/0111463 A1* | 5/2010 | Mori et al. ......................... 385/2 |

* cited by examiner

SWITCHABLE DELAYS OPTICAL FIBRE TRANSPONDER WITH OPTICAL GENERATION OF DOPPLER SHIFT

The invention concerns a switchable delays optical fibre transponder with optical generation of Doppler shift.

More in detail, the transponder according to the invention utilises delays that are switchable between different optical fibre lines, so as to be able to select many different lengths without the necessity of re-designing the same transponder. Moreover, the transponder according to the invention uses a Single Side Band (SSB) optical component which produces an optical shift of the frequency of the radar signal, that avoids the drawbacks and solves the problems of the traditional electrical systems. The transponder according to the invention is comprised in multifunctional radar systems and allows at least three different uses: the first is the systems calibration on the basis of moving targets that are simulated in the production step, the second one is the performances test of a radar that has already been calibrated in the step of the system acceptance by the client (Field Acceptance Test), and the third one is the support to the identification of possible faults and nonworking parts of the radar, during the operation life of the same radar system. The transponder of the invention comes out to be easily producible and transportable.

In the following, for explanatory simplicity, one will make reference to the use of the invention for the radar calibration, however it is to be understood that the same invention can be used for the other above-indicated aims without substantial modifications.

The radar function is based on a detection of a signal coming from the target, that is coherent with the signal emitted by the source: therefore the signal is characterised by the signal dynamics measured by the signal-to-noise ratio (SNR) parameter and by the precision of measurement of the delay corresponding to the target distance. It is therefore important to be able to calibrate such systems with respect to the delay measurement, in order to verify their ability to succeed in discriminating at best the signals relevant to the target with respect to the noise.

The calibration of the radar systems, for example with phased array antenna, can become a complicated and expensive operation in the case one intends to calibrate the whole system in exhaustive way with respect to its spatial scanning and resolution and reached range; in such a case, the whole antenna is tested with respect to the flight of a real test target.

In order to calibrate the radar, alternatively, one simulates the presence of the test target. In such a case, the radar signal is elaborated by a transponder, in which a delayed replica of a wished delay is generated with high fidelity, possibly with a Doppler shift of the radar signal.

For the generation of a delay higher than a kilometer, the optical fibre has the advantage, with respect to the electrical cable, of a wide band, low weight and size, an immunity to the noises and spurious couplings of the signal.

Especially for the application where immunity with respect to noises is required, as for example for the naval radar applications, the optical fibre links can carry the radar signal up to a remote repeater, locally mobile, that allows to test the radar reception function.

For short and long range radar signals, when the range becomes higher than about 10 km, the optical link becomes the only simple solution for the generation of the necessary delay which assumes values in the range of 100 μs to 10 ms. There exist also delayed techniques based on digital memories, which however imply the RF-IF conversion, A/D conversion, the memorisation, and the D/A and IF-RF reconversion of the RF radar signal. The use of an optical link avoids the above described steps and comprises only a first RF-optical conversion and a second optical-RF conversion, as obtainable using commercial devices.

In designing optical delay lines, the choice of the radar carrier frequency and the choice of the duration of the delay that one can realise in an optical fibre cannot be made in an independent way, due to the dispersion phenomenon in the optical fibre.

Taking into account the length of the link to be realised, it comes out to be convenient using optical fibres whose chromatic dispersion D value is minimal, typically in the range 1.5 to 6 ps/(nm*Km). The choice of such dispersion values allows also to mitigate the effect of Carrier Suppression Effect (CSE), which otherwise would limit the band of the radar signal travelling through the link, thus making the transponder unusable for high frequencies.

In particular, by using a fibre with D=6 ps/(nm*km), one can realise the transponder with frequencies management ability such to allow its use in radar systems:
  long range up to S-band (1.5 to 2.5 GHz);
  medium range up to C-band (4 to 6 GHz);
  short range up to Ku-band (12 to 18 GHz).

For higher values of chromatic dispersion in the optical fibre and/or of radar operation band, one has to adopt mechanisms of compensation of the chromatic dispersion, among which there is the use of the above mentioned SSB optical modulation, which nowadays is realised electrically.

Moreover, the transportability of the transponder provides for an additional flexibility in the use of the apparatus, and makes its application easier in the operation site of the radar system.

Making more specific reference to publications in the prior art, the U.S. Pat. No. 5,493,304 indicates a general solution for the radar calibration, which makes use of optical fibre lines effectuating delays to simulate a target, as well as a Doppler modulator. More in detail, the method according to U.S. Pat. No. 5,493,304 provides for the transmission of a multitude of test excitation signals at equally interspaced frequencies, which cover the interest frequency band, to synthesise in such a way a very short excitation impulse. The response of the system to the excitation impulse is measured and analysed for the calibration. The excitation signals are time delayed in a different way by using respective optical fibres delay lines. Transistors switches are used to select the delay line. One can add a Doppler modulation to the signals, obtained electrically in a known way, as well as a variable attenuation, to simulate a moving target.

In the U.S. Pat. No. 6,492,939 an optical line is also used to create a test delay. A Mach-Zender modulator is used to add information on to the carrier, but not to suppress the optical carrier for the generation of a Doppler signal.

The U.S. Pat. No. 5,518,400 describes another example of system for the radar calibration, which uses different and separate optical fibre delay lines, as well as a digital generator of Doppler signal.

The patent EP 0358756 concerns a testing method for analysing the phase noise that is present in a test signal, such test signal being obtained by splitting a signal on two lines: the first one is an optical fibre delay line and the second one is a phase shift line for generating a calibration signal, and by mixing the two finally obtained signals in an only signal which will be analysed using an oscilloscope. Owing to the fact that the calibration signal shift is perfectly known, one will be able to calculate the intensity of the noise signal precisely.

Finally, the patent FR 2562354 describes a single side band analogical frequency transponder, that is realised electrically.

The above mentioned patent documents present some limitations that are overcome by the present invention, and in particular:
- in the case where the delay implementation is effected in the optical domain, the Doppler shift is implemented in the electrical (analogical or digital) domain;
- they present the generation of the Doppler shift that is not implemented in an integrated way in the electro-optical modulation device, but with a dedicated device which therefore increases the complexity and the losses on the high dynamics signal.

All the above mentioned documents are integrally included by reference in the present description.

It is object of the present invention an optical modulator that solves the problems and avoids the drawbacks of or constitutes valuable alternative to the prior art devices.

It is further object of the present invention an optical fibre Doppler shift generator which solves the problems and avoids the drawbacks of or constitutes valuable alternative to the prior art devices.

It is further specific object of the present invention an optical link for the generation of switchable delays that solves the problems and avoids the drawbacks of or constitutes valuable alternative to the prior art devices.

It is further specific object of the present invention a transponder for the radar calibration which solves the problems and avoid the drawbacks of or constitutes valuable alternative to the prior art devices.

It is subject-matter of the invention an optical modulator, comprising an input suitable to receive an optical carrier, a high-frequency input and an output suitable to transmit an optical signal, the optical modulator comprising two Mach-Zender modulators in parallel between the input and output, which constitute two different optical paths, the whole circuit constituting a third Mach-Zender modulator, the optical modulator being characterised in that:
- the first Mach-Zender modulator is provided with an electrode suitable to carry, inside the modulator, two signals, each obtained by the sum of the two tones $f_R$ and $f_D$, of equal power but dephased of $\pi/2$, being further provided an electrode for realising a Single Side Band modulation of the tones $f_R$ and $f_D$;
- the second Mach-Zender modulator is provided with an electrode to realise statically a phase inversion of the optical carrier;

the third Mach-Zender modulator comprising an electrode suitable to realise the summation of the signals deriving from the first and the second Mach-Zender modulator before the output, so as to suppress the optical carrier and thus obtaining only the tones $f_R$ and $f_D$ in the optical spectrum.

Preferably according to the invention, the three Mach-Zender modulators are integrated on an only chip of Lithium Niobate.

It is further specific subject-matter of the present invention an optical generator of Doppler frequency, comprising in cascade connection a generator of two tones $f_R$ and $f_D$ on optical carrier, a RF mixer, a RF divider, a dephasing device for the $\pi/2$-dephasing of a tone with respect to the other, an optical modulator and a photodiode, characterised in that the electro-optical modulator is the modulator according to the invention.

With respect to U.S. Pat. No. 6,492,939, the Mach-Zender modulator is used in the present invention in order to suppress the optical carrier in the generation of a Doppler signal, suppression that is realised on a purely optical input signal.

It is further specific subject-matter of the invention an optical link for the generation of a variable optical delay, comprising a laser, an optical modulator, an optical delay module, and a photodiode, characterised in that the optical modulator is the modulator according to the invention.

Preferably according to the invention, the optical delay module comprises more optical fibre delay stages in cascade connection, each stage producing a delay that is double with respect to that of the preceding stage, between two successive stages being connected an optical switch, further two optical switches being provided at the beginning and at the end of the optical delay module, in such a way that, by activating or deactivating such optical switches, the signal goes through the whished number of delay stages.

Preferably according to the invention, the delay stages are at least five.

Preferably according to the invention, the optical link comprises, at the end of the link where the optical coupler is connected, two fibre segments of different lengths and two corresponding optical receivers, thus obtaining two dephased signals apt to the simultaneous simulation of two targets for the measurement of the resolution of a radar, in particular within the same radar cell.

It is further specific subject-matter of the invention a transponder, in particular for the calibration, the testing and the performances test of a radar, in particular a "phased-array" radar, comprising an input block and an output block that monitor the RF power levels respectively in input and output, as well as a delay optical link as above described.

Preferably according to the invention, the delay optical link comprises a control block that monitors the temperature values of the thermo-regulated components, such as for example the optical amplifiers and the lasers.

Preferably according to the invention, the input block, the output block, and the control block further monitor the optical power values at the outputs of the optical amplifiers and at the input of the utilised photodiodes.

With respect to buy attempts U.S. Pat. No. 5,493,304, the solution here proposed certainly solves the same general technical problem, but differs on two specific aspects:
- an optical switch delay line, which is able to simulate the moving of a mobile target thanks to the switching between different delays;
- a device of suppression of the optical carrier directly from an optical input.

The invention will be now described, by way of illustration but not by way of limitation, on the basis of some embodiments, making reference to the figures of the enclosed drawings, wherein.

In the embodiments that will be described in the following, one makes reference to a transponder realised in the first version for a medium-range radar (100 km) covering in its basic version a calibration functionality up to the limit of the Ku band, and to the one realised in a second version with SSB modulation for a longer range radar (500 km) that is operating in the L band, provided that the same general architecture of the transponder is used, such applications being not limiting for the generality of the following treatment.

The transponder according to the invention in this embodiment comprises the function of selectable delay, measurement of the radar range resolution, as well as generation of the Doppler shift, for the simulation of moving target and the generation of noise for the clutter simulation.

Moreover, the transponder according to the invention comprises the function of range resolution, with a solution allowing the simulation of two targets in the same radar cell, as illustrated in the following.

Figure 1:
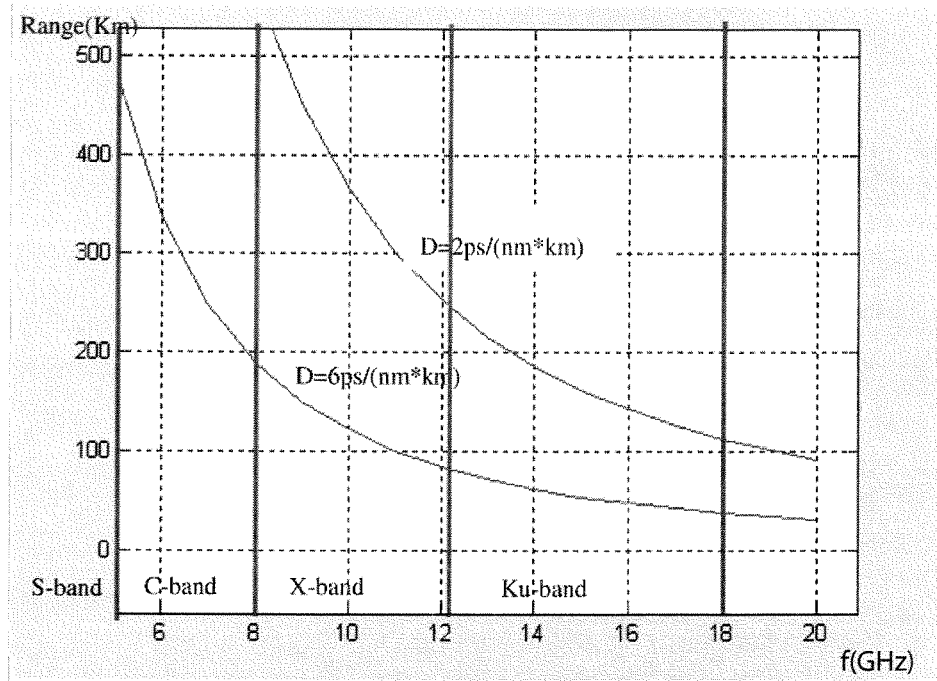
FIG. 1 shows the limitation on the transponder range due to CSE effect on the various radar operation bands.
Figure 2:
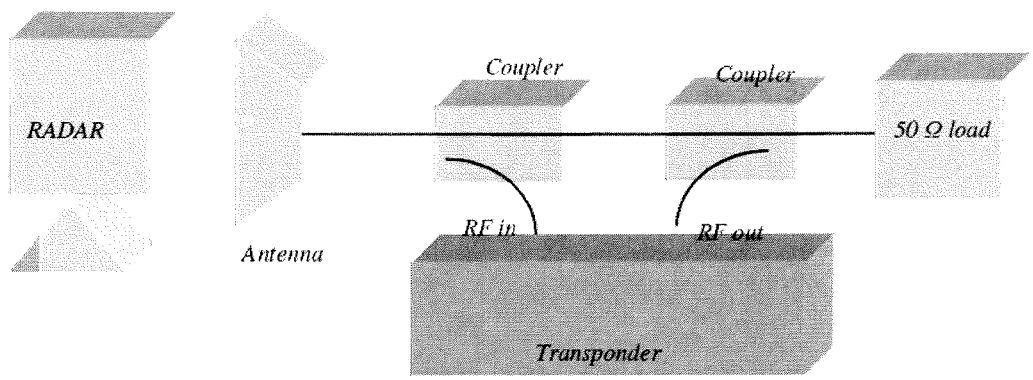
FIG. 2 shows the classical scheme of the system with the transponder for the radar antenna calibration.

Making reference to FIG. 2, according to the classical scheme, functionally, the radar signal is transmitted to the radar antenna and is received the by that of the transponder, placed at a distance of few kilometers, in order to allow the formation of the radar beam in the far field. The signal is then attenuated at once and applied to the input of a first directional coupler; in turn, the output of the transponder is re-inputted in the antenna, by means of a directional coupler.

The elaboration of the received signal, by the radar system, will provide all the useful data, as for example data of distance, Doppler, resolution, which will be able to be compared with known values of the transponder, measured in laboratory, to verify the precision of the radar detection.

Architecture of the Transponder

The transponder according to the invention, placed in a remote position from the radar, needs not any connection with the same and is able to characterise the radar system in terms of:
  radar range;
  distance and angle precision;
  distance and angle resolution (by using two directional antennas);
  position and the resolution in the detection of the jammer (jammer strobe by using a noise generator);
  detection in the present of jammers;
  Side Lobe Blanking (SLB);
  geographical alignment;
  on-the-field estimation of the antenna beam features.

In particular, the optical fibre transponder according to the invention allows the generation of a back-echo that is sufficiently delayed so as to be temporarily separated with respect to the other clutter spurious echoes, the back-echo coming from the reflector support (mountain, mast, tower).

Moreover, in the case of tracking radar, the optical fibre transponder according to the invention allows the closing of the AGC (Automatic Gain Control, angle and range) loops and the test of the locking of a mobile target.

The salient characteristics of the instrument, illustrated in the following, make it a solution for a wide gamut of radars; they are:
  amplitude stability of the retransmitted echo;
  delay length that is comparable to the radar range (even for distances of some hundreds of kilometers);
  overlap of Doppler frequencies to the retransmitted echo;
  possibility of summing up, to the replica, a noise or disturbance (continuous wave (CW) and modulated CW);
  measurement of angle and range resolution;
  field transportability, electromagnetic compatibility (EMC) of the optical fibre;
  usability with wideband signals (from L band to Ku band).

Figure 3:
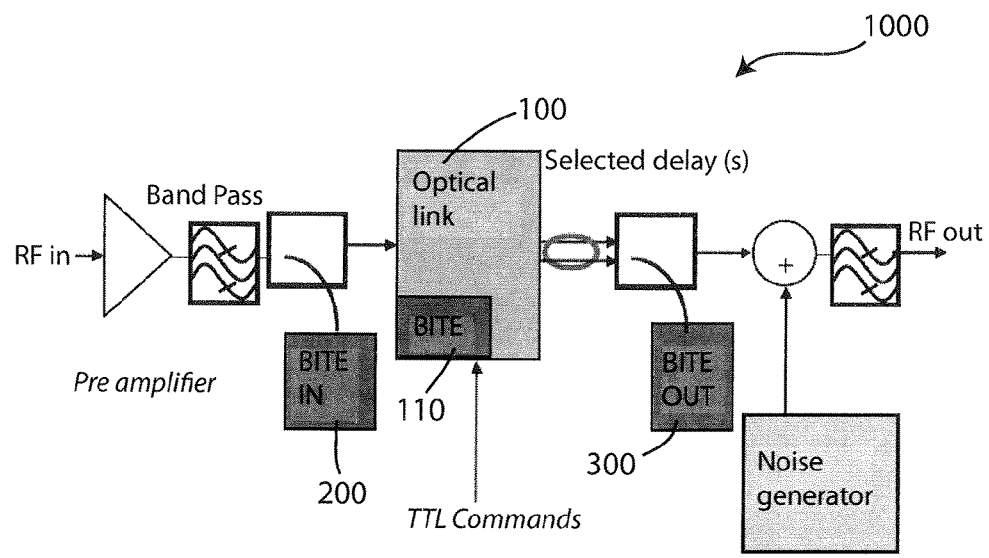
FIG. 3 shows the general scheme of the architecture of the photonic transponder according to the invention.

Going into the details, and making reference to FIG. 3, the transponder architecture 1000 according to the invention includes in the optical link 100 the switch functionalities between the delays and the generation of the Doppler frequency.

The blocks "BITE IN" 200 and "BITE OUT" 300 monitor the RF power levels respectively in the input and output, whilst the block "BITE" 110 of the link monitors the temperature of values of the thermo-regulated components, such as optical amplifiers, lasers, etc; the block "BITE" 110 of the link further monitors the optical power values in the input to the photodiodes, such values accounting for the stability of the optical link gain.

Figure 4:
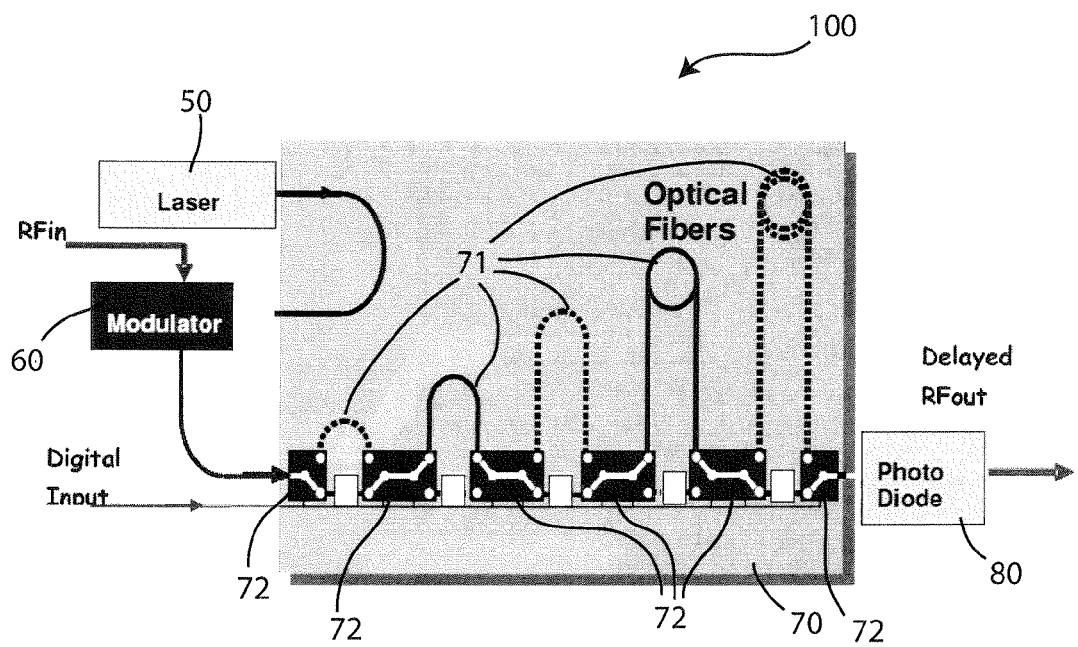
FIG. 4 shows a model of the switchable delays optical link in the transponder according to the invention.
Figure 5:
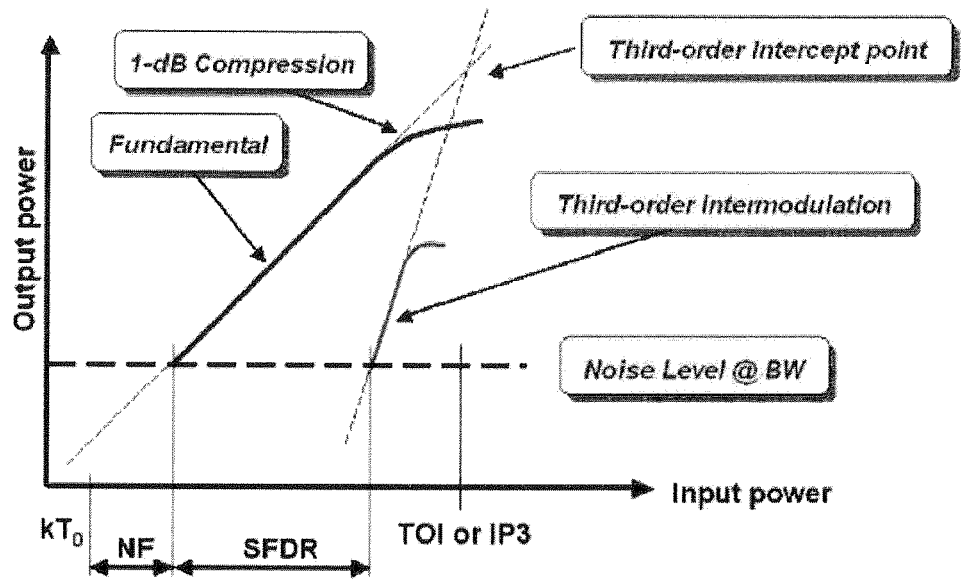
FIG. 5 shows an illustration of the parameters characterising the dynamics of an optical link.

The architecture of the photonic part (optical link 100 in FIG. 3) of the transponder is exemplified in FIG. 4.

In the modulation section, one implements the Doppler shift of the target, whilst in the optical switches section one implements the target switchable delays of the bitwise type, according to the specific technical solution of the invention. A double delayed output (not shown in FIG. 4) is used for the measurement of the range resolution of the radar system.

Making still reference to FIG. 4, with the switches section one implements a system of bitwise basic switchable delays, comprising a laser 50, a modulator 60, a delay optical link 60 and a photodiode 80.

The amount of delay stages 71 shown in this illustrated embodiment is 5; each stage corresponds to an optical fibre path that is the double with respect to the preceding one; therefore it will be sufficient a 5-bits digital TTL signal to control the delay function.

The functioning in Time Domain optical Multiplexing (TDM) consists in making the signal going through, along time, different paths obtained by the different switch of the switches 72. This system can in general be implemented when the level of the spurious replica (corresponding to different non-selected delays) of the radar impulse is below the sensibility of the radar.

The amount of selectable delays can be increased at the expense of the complexity/cost of the apparatus or the increasing of the insertion losses; such a parameter is controlled by the amount of delay stages, or equivalently by the amount of the utilised switches pairs.

The switches architecture allows to have, for all the possible delays, an only RF output.

Figure 7:
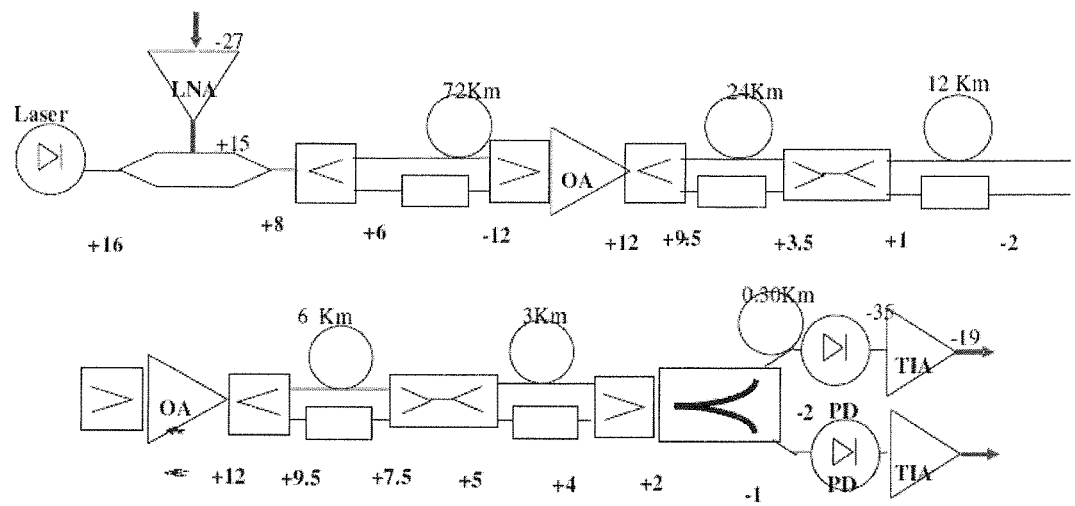
FIG. 7 shows the detailed scheme of the optical link in the illustrated embodiment of the transponder according to the invention, including the relevant legend and numerical specification.
Figure 7:
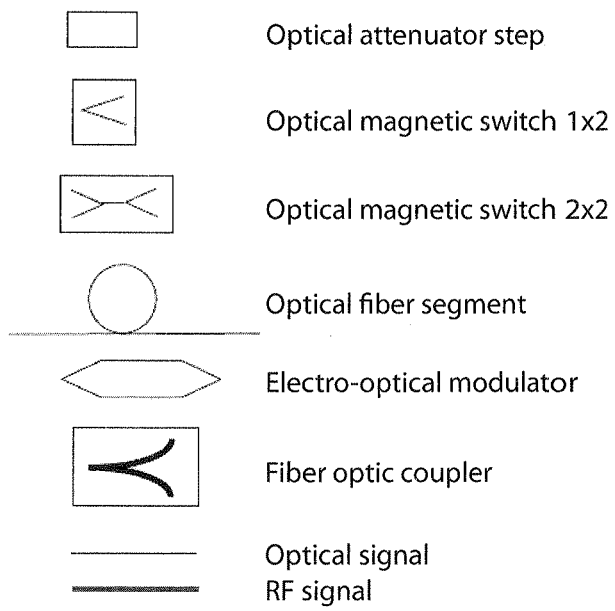

Making reference to FIG. 7, the measurement of the range resolution of the radar system is implemented in general with the presence of a simultaneous delays pair whose difference is of the order of tens of nanoseconds, or equivalently tens of fibre meters; this functionality is implementable in an easy and low expensive way, by adding a coupler at −3 dB and a photodiode after the delays block and by alternatively selecting only one or both outputs, when one wishes to produce both simultaneous echoes for the measurement of the radar range resolution.

Typical value for the resolution cell of a long range radar is 800 ns corresponding to 240 m of slant range. Therefore, in this case, the measurement of the radar resolution needs an additional optical fibre segment of 300 m, and two independent receivers.

In the realisation of the transponder one implements an amplitude modulation of the RF signal by means of an electro-optical modulator of the Mach-Zehnder type; if one has additionally the aim of realising a transponder that can cover any frequency range for the radar impulse from DC up to 20 GHz, it comes out to be necessary a modulator with travelling wave technology. Such a modulator has been realised by the applicant in Lithium Niobate using the know-how of the same applicant in the production of modulators and in particular for analogical radar application. The substrate of the device will have a cut of the X-cut type and with electrodes in push-pull configuration.

Such technical specifications, that makes reference to a particular embodiment of the invention, besides offering the widest possible bandwidth, allow to realise a completely chirp-free modulation, and this helps mitigating the effects of the optical fibre dispersion that, for long range applications, amounts to values up to 2 ns/nm.

In the present embodiment of the transponder according to the invention, the transponder has a maximum range of 86 km that is equivalent to a delay of the maximum impulse of 575 ms and, as a consequence, it proves apt to the calibration of medium-range radars.

The considered noise band will be limited by the electronic elaboration blocks after the optical link and will be considered equal to 2 MHz, considering it as upper limit to the IF band of radar impulse. In the following table, the main characteristics of the chosen embodiments are summarised:

| Specification | Value | Notes |
| --- | --- | --- |
| Band | L, S, C, X, Ku | |
| Flatness in the operation band | +/−6 dB | |
| Possible distance of the simulated target | From 0 to 86 Km minimum step 2.25 Km | Propagation delays, up to 575 µs with minimum step 15 µs |
| Delay for the resolution measurement | Radar Cell of 800 ns | Optical fibre segment 300 m |
| Transponder gain | >0 dB | |
| Levels of the spurious harmonics in output | <−50 dBc | |
| Output Signal Noise Ratio | >50 dBc | IF radar BW = 2 MHz |

Figure 6:
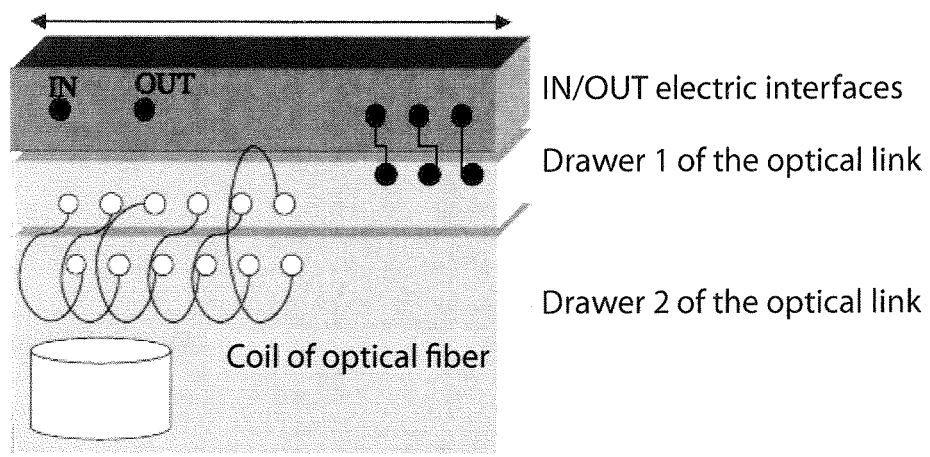
FIG. 6 shows the general mechanical structure of the transponder according to the invention.

In FIG. 6, the general mechanical structure of the transponder according to the invention is illustrated. In particular, the drawer 2 contains the optical link schematised in FIG. 7 (which comprises also the corresponding legend).

The design of the mechanical structure of the transponder satisfies needs coming from the application of the transponder in the radar systems.

Such needs are:
modularity of the parts;
scalability of the apparatus;
standardisation of mechanisms and interfaces.

The modularity allows obtaining a subdivision of the functions, hence a better access of the parts in the device maintenance step, an easier identification of the faults, and the reduction of the sizes.

The scalability of the apparatus allows to use the same electrical and optical mechanical interfaces, for the width of the operation band or the modification of the entity or the number of switchable delays.

Moreover, the realised layout makes the device expandable; indeed, within certain limits, it is possible to modify the selectable delays, by simply substituting the optical fibre coils.

The standardisation consists in the possibility of integrating the apparatus in the most common standard shelter. Once integrated in the shelter, the system will come out to be hardier than the environmental stresses, as well as satisfying the requirements for the system in the operating environment (MILitary StanDard (MIL STD). The shelter guarantees inside itself an environment suitable for the characteristics of the transponder and further it has been already tested according to the MIL STD standards for problems comprising for example: flood, inclination, altitude, immunity to electromagnetic (EM) disturbances.

In such a way, the transponder can constitute an equipment assembly for the radar system, and not only an accessory tool.

Optical Link

Making reference to FIG. 7, the value of the optical power is indicated in bold along the optical link, as well as the length of the fibre segments and the values of the RF power in input or output to the optical link.

Suitable optical attenuators will be used in the paths that are not delayed in the optical fibre, in order to equalise the optical power levels corresponding to different delays; this leads the optical amplifier to work with constant input power, and this determines its performances in terms of noise figure (NF) and gain. Two optical amplifiers are utilised in order to compensate the accumulated losses in the optical link of the transponder.

Doppler Shift

It is of particular interest for the applications of the photonic technologies to radars the fact of being able to generate, directly within the optical link, the shifted frequency of the Doppler tone with frequency $f_D$ (of the order of some KHz), starting from the originary input radar frequency $f_R$.

Such a processing of the radar signal is usually effected, using traditional electronic technologies, by means of a Single Side Band mixer, based on a diodes network; in the mixer, the in-phase and in-quadrature components of the Doppler tone are mixed with the input radar signal in such a way to obtain an upconversion of the radar frequency equal to $f_R+f_D$.

Merit figure for a Doppler generator is the suppression of the input radar signal (carrier), and the suppression of the Doppler spurious components produced by the mixing $f_R-f_D$, $f_R+3f_D$, $f_R-3f_D$, etc.

For the reference application, a suppression of the input signal is required, that is at least of 26 dBc referred to the output shifted Doppler and a suppression of at least 26 dB for all the other spurious components of the mixing.

In the following, one proposes a solution according to the invention for the photonic generation of the radar Doppler, that uses architectures based on the external modulation obtained by using modulators of the Mach-Zender (MZM) type.

It is known that a simple MZM modulator, suitably polarised at the extinction or at the maximum of the transfer function, produces non-linearities, that can be exploited to obtain the intermodulation of even order of two RF input tones ($f_R-f_D$); among these intermodulations, the upconversion $f_R+f_D$ and downconversion $f_R-f_D$ ones are present.

Therefore, the obtaining of a simple upconversion of an input tone without downconversion is of higher difficulty.

In the Single Side Band optical modulation technique one notes, based on observation in the optical spectrum, that, starting from the two input tones $f_R$ and $f_D$, it is possible to generate $f_R-f_D$ without $f_R+f_D$, but in this case, at the end of the optical link, it is impossible to suppress the input frequencies and therefore also the $f_R$ radar carrier. This problem is tackled in the two architectures described in the following. In both techniques, the modulation of the RF signal is effected in Single Side Band.

In such techniques, by using the traditional technique of the optical carrier suppression, the shifted Doppler frequency is generated directly in the step of modulation of the radar signal on optical carrier. It deals therefore with providing a spatial modulator which allows to obtain, at the output of the optical link, the desired frequency $f_R-f_D$, starting from the two input tones.

Hence, with respect to the traditional mixing schemes, an only optical modulator component functions as transmitter and as mixer as well and allows to generate at the output of the link the shifted radar carrier.

In the first solution, one uses a modulator of the SSB suppressed carrier (SC) type. This SSB modulator, here utilised ad hoc, is generally used in the telecommunications for the fibre transmission of one or more RF channels with high spectral efficiency, i.e. with low optical spectrum occupation, with low optical nonlinearities, and with reduced fading effect besides for special modulations of digital signals as for example the FSK one.

Figure 8:
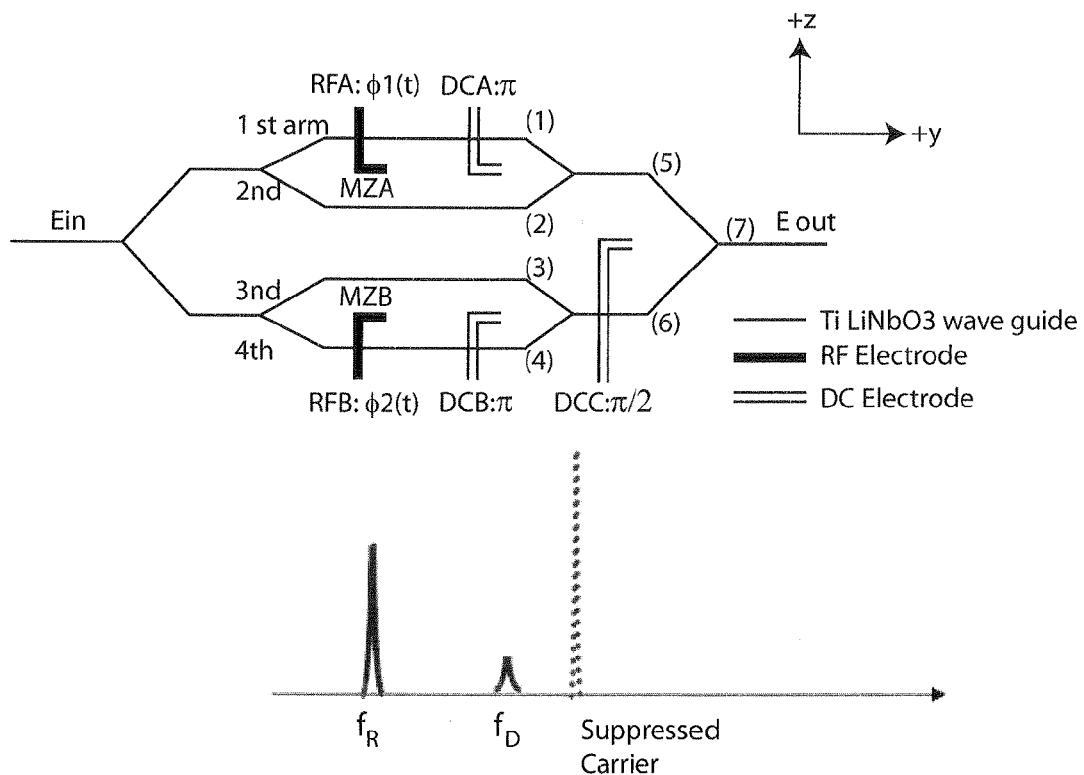
FIG. 8 shows an architecture of SSB modulator component with suppressed carrier for a Doppler shift with optical spectra at its branches, according to the invention.
Figure 9:
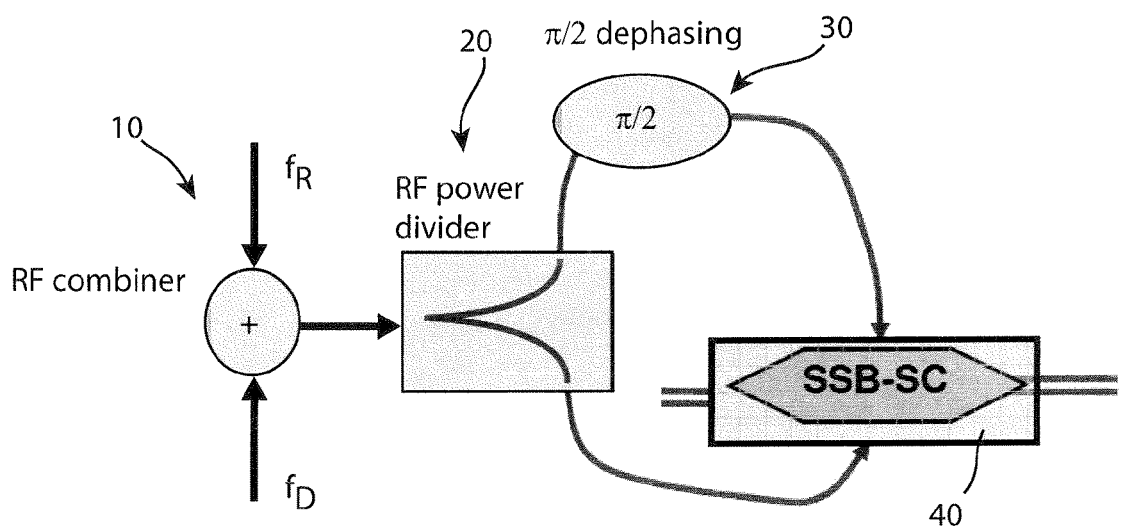
FIG. 9 shows a steering scheme of a first Mach-Zender modulator (MZM) according to the invention.

Making reference to FIG. 8, the modulator is constituted by three MZ interferometers (MZA. MZB, and the assembly of the two ones on the circuit) integrated on an only chip of Lithium Niobate. The Doppler signal (few kHz) is summed up to the radar signal (few gigahertz) by using a RF combiner; in order to realise the SSB modulation, the obtained signal is divided and dephased between the two inputs RF1 and RF2 of $\pi/2$, as schematically shown in FIG. 9. The counterphased spectra cancel thus the carrier.

By applying the suitable voltages to polarise the three interferometers as in FIG. 8, one obtains the output optical spectrum for the Doppler shift; the photodiode at the end of the optical link realises the beat for obtaining the only frequency $f_R-f_D$.

The modulation depth of the RF signal in the interferometer 1 determines the amplitude of the optical carrier; as it comes out from the following expressions for the amplitude of the output optical carrier:

$$Pottica = 0.25 * J_0(A_D)$$

where $A_D$ is the modulation depth.

The beat between the two modulation lobes on the optical receiver causes a strong power loss of the RF signal at the link output, if we compare it to a link with standard MZM modulator; one can remedy this by increasing the modulation depth for the radar signal, while instead it is not possible to increase the modulation depth for the Doppler signal, without reducing the suppression of the spurious harmonics of the Doppler shift.

Figure 10:
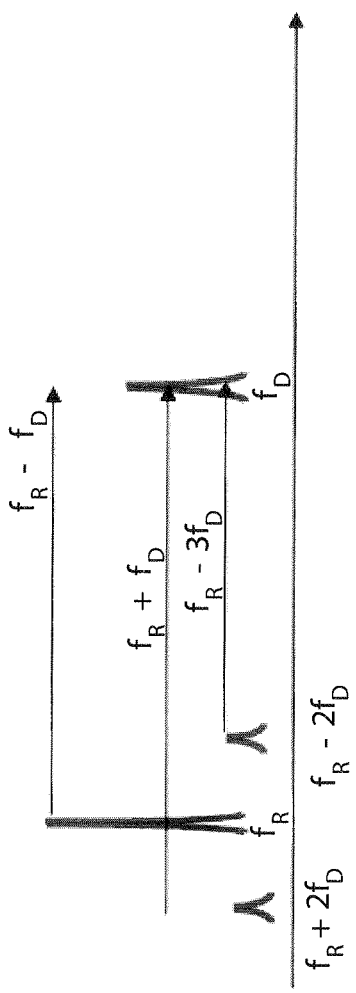
FIG. 10 shows an optical spectrum at the output of the modulator, inclusive of the spurious harmonics due to intermodulation non-linearity of order three (IM3)

FIG. 10 shows the optical spectrum and the modulator output.

The suppression of the most relevant spurious signals at frequencies $f_R+f_D$ and $f_R-3f_D$ with respect to $f_R-f_D$ is equal to:

$$(J_0(A_D)/J_2(A_D))^2$$

being $A_D=\pi*V_D/V\pi$ the modulation depth of the Doppler frequency.

As one sees, such parameter does not depend on the radar signal power, that therefore can be increased up to the compression of the modulator.

Factors limiting the suppression of the spurious harmonics are:

the extinction of the optical carrier (Extinction Ratio of the modulator);

the suppression of the modulation lateral lobe of the SSB modulator that nowadays, for signals in the X band, is of about 21 dB.

Concerning the suppression of the input signal $f_R$, this is strictly connected to the extinction of the optical carrier; with the state of the art technology, it is possible, in the whole interferometer, to reach extinction levels around 30 dB, with a bias active control in the junction of the two branches; this implies a suppression of the radar signal power up to 60 dB that is hardly reachable by using techniques in the electrical domain.

Figure 11:
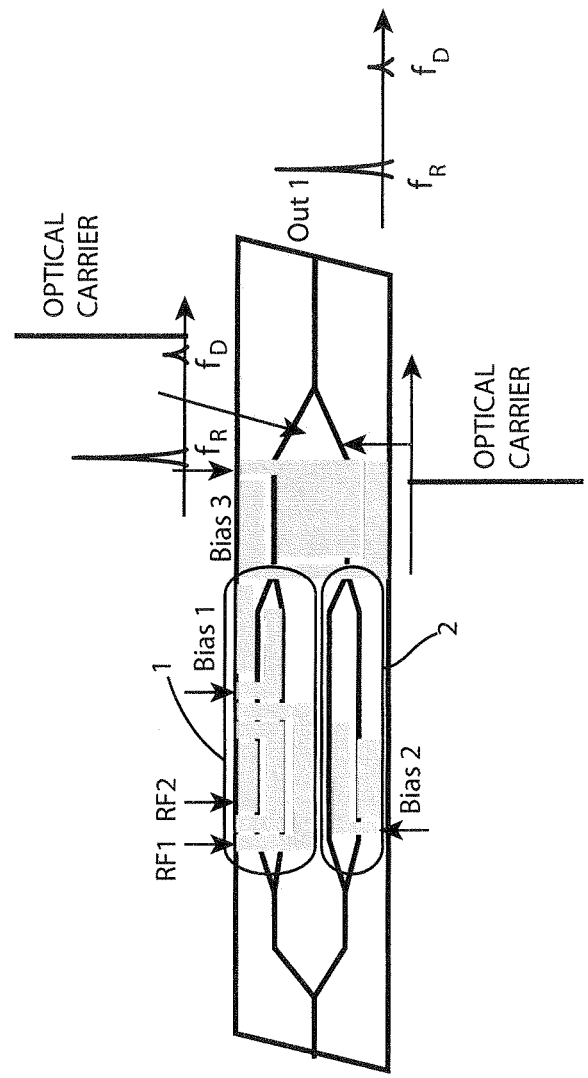
FIG. 11 shows an architecture of SSB modulator component with suppressed carrier for a Doppler shift with optical spectra at its branches, according to a preferred embodiment of the invention.

Making reference to FIG. 11, the second solution is based on a modulator that is advantageous in terms of obtainable performances, mixing efficiency and suppression of the unwanted harmonics. The principle implemented in this device is still that of the optical carrier suppression.

The modulator is constituted by three MZ interferometers integrated in only chip of Lithium Niobate.

The Doppler signal ($f_D$, for example few KHz) is summed up to the radar signal ($f_R$, for example few GHz) by using a RF combiner. To realise the SSB modulation, the signal thus obtained is divided and dephased of $\pi/2$ in two RF1 and RF2 components, as in FIG. 10 relevant to the first solution, but these two signals are then provided to a SSB modulation instead of SSB-SC modulation as in the first solution.

In the interferometer indicated by 1, the dual drive modulator (the assembly of RF1, RF2, Bias 1) is arranged for the SSB modulation if the RF1 signal is of equal power and dephased of 90° with respect to RF2.

In the interferometer indicated by 2, one exploits the interference controlled by the Bias 2, for performing the function of variable attenuator.

In the whole interferometer indicated by 3, one implements the suppression of the optical carrier of the modulated signal, by means of the destructive interference of the signals generated by the two above described MZM, by using the Bias 3.

In such a way, one has not added a Doppler signal already formed beforehand to the optical carrier, which is then suppressed, but the whole is realised in the same optical modulator, making the optical carrier enter both branches and the dephased copies of the two radar and Doppler tones enter only in one branch.

Here as well, as in the first solution, the optical spectrum of the output of the three interferometers is drawn in FIG. 11, the photodiode at the end of the optical link realising the beat to obtain the only frequency $f_R-f_D$.

The possibility of statically modulating the amplitude of the optical carrier in the interferometer 2 allows to obtain the extinction of the carrier; it is indeed known that the modulation depth of the RF signal in the interferometer 1 determines the amplitude of the optical carrier (see also formula (12) of D3, G. H. Smith at al. "Overcoming Chromatic-Dispersion Effects in Fiber-Wireless Systems Incorporating External Modulators", IEEE Transactions on Microwave Theory and Techniques, vol. 45, no. 8), as it comes out from the following expressions for the amplitude of the output optical carrier:

$$Pottica = 0.5 * J_0(\pi V/V_\pi) + 0.5 * e^{i\pi V/V\pi}\alpha$$

where $\alpha$ is the loss introduced by the interferometer 2 and V the voltage corresponding to Bias 3.

The beat between the two modulation lobes on the optical receiver causes a strong loss of the power of the RF signal at the link output, if one compares it to a link with a standard MZM modulator; one can remedy to this by increasing the demodulation depth for the radar signal, while instead it is not possible to increase the demodulation depth for the Doppler signal, besides the limits fixed in the above table.

Making reference to FIG. 10 as well, the suppression of the most relevant spurious signals at frequencies $f_R+f_D$ and $f_R-3f_D$ with respect to $f_R-f_D$ is equal to:

$$(J_0(A_D)/J_2(A_D))^2$$

being $A_D=\pi*V_D/V\pi$ the demodulation depth of the Doppler frequency.

As already observed for the first solution, such a parameter does not depend on the power of the radar signal, which therefore can be increased up to the compression of the modulator.

The factors limiting the suppression of the spurious harmonics as well as the input signal $f_R$ has been already mentioned for the first solution.

With the just described second solution, one has the possibility to produce more easily the modulator, because, contrary to the first solution, here one uses an only RF electrode on an only MZM.

The Optical Fibre Transponder (OFT) allows the generation of a back-echo sufficiently delayed to be temporarily separated with respect to the other clutter spurious echoes coming from the support (mountain, mast, tower) of the reflector.

The introduction of the optical fibre transponder provides an efficient and flexible tool that:
- significantly reduces costs and times for the validation of the systems in the development step;
- potentially can be provided as optional as a set for the traditional radar systems,
- it is re-usable for other radar systems independently from the operation frequency (system is wideband);
- allows to improve the position of the radar measurements mainly in terms of geographical alignment.

The preferred embodiments have been above described and some modifications of this invention have been suggested, but it should be understood that those skilled in the art can make variations and changes, without so departing from the related scope of protection, as defined by the following claims.

The invention claimed is:

1. Optical modulator, comprising an input suitable to receive an optical carrier, a high-frequency input and an output suitable to transmit an optical signal, the optical modulator comprising two Mach-Zender (1,2) modulators in parallel between the input and output, which constitute two different optical paths, the whole circuit constituting a third Mach-Zender modulator (3), the optical modulator being characterised in that:
- the first Mach-Zender modulator (1) is provided with an electrode suitable to carry, inside the modulator (1), two signals (RF1, RF2), each obtained by the sum of the two tones $f_R$ and $f_D$, of equal power but dephased of $\pi/2$, being further provided an electrode (Bias 1) for realising a Single Side Band modulation of the tones $f_R$ and $f_D$;
- the second Mach-Zender modulator (2) is biased by means of a DC electrode (Bias 2);
- the third Mach-Zender modulator (3) comprising an electrode (Bias 3) suitable to introduce a proper additional dephasing aimed at realising the reversal of the optical carrier phase of the signals deriving from the first (1) and the second (2) Mach-Zender modulator before the output, so as to suppress the optical carrier by means of destructive interference and thus obtaining only the tones $f_R$ and $f_D$ in the optical spectrum.

2. Optical modulator according to claim 1, characterised in that the three Mach-Zender modulators are integrated on an only chip of Lithium Niobate.

3. Optical generator of Doppler frequency, comprising in cascade connection a generator of two tones $f_R$ and $f_D$ on optical carrier, a RF mixer (10), a RF divider (20), a dephasing device (30) for the $\pi/2$-dephasing of a tone with respect to the other, an optical modulator and a photodiode, characterised in that the electro-optical modulator is the modulator according to claim 1.

4. Optical link for the generation of a variable optical delay, comprising a laser (50), an optical modulator (60), an optical delay module (70), and a photodiode (80), characterised in that the optical modulator (60) is the modulator according to claim 1.

5. Optical link according to claim 4, characterised in that the optical delay module (70) comprises more optical fibre delay stages (71) in cascade connection, each stage producing a delay that is double with respect to that of the preceding stage, between two successive stages being connected an optical switch (72), further two optical switches (72) being provided at the beginning and at the end of the optical delay module (70), in such a way that, by activating or deactivating such optical switches (72), the signal goes through the whished number of delay stages (71).

6. Optical link according to claim 5, characterised in that the delay stages are at least five.

7. Optical link according to claim 4, characterised in that it comprises, at the end of the link where an optical coupler is connected, two fibre segments of different lengths and two corresponding optical receivers (PD), thus obtaining two dephased signals apt to the simultaneous simulation of two targets for the measurement of the resolution of a radar, in particular within the same radar cell.

8. Transponder, in particular for the calibration, the testing and the performances test of a radar, in particular a "phased-array" radar, comprising an input block (200) and an output block (300) that monitor the RF power levels respectively in input and output, as well as a delay optical link (100) as described in claim 4.

9. Transponder according to claim 8, characterised in that the delay optical link (100) comprises a control block (110) that monitors the temperature values of the thermo-regulated components, such as for example the optical amplifiers and the lasers.

10. Transponder according to claim 9, characterised in that the input block (200), the output block (300), and the control block (110) further monitor the optical power values at the outputs of the optical amplifiers and in input to the utilised photodiodes (100).

* * * * *